Patented Jan. 22, 1935

1,988,905

UNITED STATES PATENT OFFICE 1,988,905

MANUFACTURE OF LEATHER

Heinz Kroch, Berlin-Charlottenburg, and Frank A. English, Frankfort-on-the-Main-Niederrad, Germany No Drawing. Application April 20, 1932, Serial No. 606,518. In Germany May 13, 1931

19 Claims. (Cl. 149—6)

The invention relates to an improved process in the manufacture of leather. Hitherto in order to soften leather, castor oil, fish oil or neat's foot oil have been applied to the tanned leather. According to the invention the oil to be used is emulsified in warm (50–70° C.) water and this emulsion brought into contact with the leather to be treated in a cask which is rotated by any suitable means. 60–300% (preferably 100%) of the emulsion (calculated on the weight of the pared leather) is applied for about 15–45 minutes, such emulsion containing about 2% of the oil (calculated on the weight of the pared leather). For carrying out the new process vegetable oils are used which contain 85–95% of esters of unsaturated fatty acids of the oleic acid series, liquid down to temperatures between —6° to —25° C. Such oils are: Tea-seed oil, apricot oil, peach kernel oil, almond oil. It is also possible to use mixtures of these oils for the lubricating purpose.

According to the invention it has been shown furthermore that the sulfonated products of said oils may be used advantageously; especially it has been shown that tea-seed oil gives the best results, more especially sulfonated tea-seed oil. In the case of tea-seed oil it is desirable to destroy the yellow dyestuff contained in the tea-seed oil by bleaching it by means of active carbon or fuller's earth or the like, because otherwise the unpurified tea-seed oil could influence the leather in an undesirable way.

By the new process it is possible to work with about 25% less oil (calculated on the weight of oil formerly used) than in the case of formerly known processes. As the price of the oils to be used is of importance, it is clear that by the new process a considerable advantage is attained.

The sulfonation of the mentioned oils has not been described yet. The sulfonation is carried out as follows:

5–40%, preferably 10–30% of sulfuric acid of about 66° Bé. (calculated on the weight of the oil to be sulfonated) are reacted on the oil vegetable at a temperature of about 35° C., preferably 28° C.; this temperature is kept in by cooling the mixture. The sulfonation is carried out in open vessels of any material (preferably iron), the inside of which is homogeneously laid out with lead; also vessels of earthware may be used. It is necessary to agitate the mixture strongly during the reaction. The process is carried on for ½–12 hours, preferably 80 minutes. The reaction-mixture is washed with water or a solution (of about 8%) of sodium chloride or magnesium sulfate at ordinary temperature or at higher temperatures up to 60° C., preferably at 45° C. By the washing-process two layers are formed. The upper one consisting of the sulfonated oil is separated and then neutralized by adding alkali.

In order to get a sulfonated product stable to lime and acid the sulfonation must be carried out so long and with such an amount of sulfuric acid that a sample taken out from the mixture does not show the reaction described in the second paragraph of Example 6. The product, which is especially suitable for the preparation of the emulsion, which is brought into contact with the leather, is obtained if the sulfonation is carried on until a sample taken out just shows the mentioned reaction.

EXAMPLES

I 140 g. of almond oil are emulsified in 20 l water by means of 80 g. Turkey red oil at about 60° C. 10 kilo of well fulled calves skins tanned with Sumach are steeped for about 45 minutes in said emulsion at about 50° C. The skins are then washed in flowing water at 30° C., then stretched, dried and dressed.

II 30 g. apricot oil, 80 g. sulfonated tea-seed oil and 20 g. sulfonated fish oil are emulsified at 60° C. in 5 l water, 5 kilo of ox hides tanned with chrome alum, after neutralizing and dyeing, are steeped for about 40 minutes in this emulsion at about 60° C. The leather is then stretched, dried and dressed with a covering dye.

III 80 g. sulfonated peach kernel oil and 80 g. sulfonated egg oil are emulsified at 70° C. in 30 l water. 20 kilo of sheep skins which have been tanned and subsequently tanned with Sumach and dyed are steeped for about 45 minutes in this emulsion at about 50° C., then stretched, dried and dressed.

IV 10 kg. of peach kernel oil is treated with 2 kg. of sulfuric acid of 66° Bé. in a vessel of iron which is homogeneously leaded. The mixture is violently agitated and is cooled by means of cooling coils placed in said vessel to a temperature of about 28° C. The reaction is carried on for about 80 minutes. Water or a solution of sodium-chloride or magnesium-sulfate (8%) is then added. The addition of water may be carried out at ordinary temperature or at higher temperatures up to 60° C., preferably at 45° C. The mixture separates into two layers: water and sulfonated product. Finally an amount of alkali is added, sufficient to neutralize the sulfonated product.

V 10 kg. tea-seed oil is treated with 2 kg. of sulfuric acid of 66° Bé. in a vessel of any material which is homogeneously leaded. The mixture is violently agitated and is cooled by means of cooling coils placed in said vessel to a temperature of about 28° C. The reaction is carried on for about 80 minutes. Water or a solution of sodium-chloride or magnesium-sulfate is then added. The addition of water may be carried out at ordinary temperature or at higher temperatures up to 60°, preferably at 45° C. The mixture separates into two layers: water and sulfonated product. Finally an amount of alkali is added, sufficient to neutralize the sulfonated product.

VI

Raw tea-seed oil is treated with fuller's earth at a temperature of 70–130°, preferably 100–115° for about half an hour. Finally the fuller's earth is separated by filtering the reaction mixture. Any amount of fuller's earth may be used, preferably 3–5 times the weight of the tea-seed oil.

The purified tea-seed oil so obtained is then treated according to Example V.

The sulfonating advantageously is carried out in such a way that the product obtained is stable to lime and acid: a sample taken out from the reaction mixture after having been emulsified with an amount of water—10–20 times greater than the amount of the sample must not separate during half an hour to one hour.

We claim:

1. Improved process in the manufacture of leather comprising the production of a watery emulsion of a vegetable oil containing 85–95% of esters of unsaturated fatty acids of the oleic acid series and being liquid down to temperatures between −6° to −25° C., finally bringing into contact such an emulsion with tanned leather.

2. Improved process in the manufacture of leather comprising the production of a watery emulsion of a vegetable oil containing 85–95% of esters of unsaturated fatty acids of the oleic acid series and being liquid down to temperatures between −6° to −25° C., this emulsion being prepared at a temperature of 50–70° C., finally bringing into contact 60–300% of said emulsion (calculated on the weight of the pared leather), containing about 2% of the oil (calculated on the weight of the pared leather) with the leather to be treated in a rotating cask.

3. Improved process in the manufacture of leather comprising the production of a watery emulsion of tea-seed oil, finally bringing into contact such an emulsion with tanned leather.

4. Improved process in the manufacture of leather comprising the production of a watery emulsion of tea-seed oil, this emulsion being prepared at a temperature of 50–70° C., finally bringing into contact 60–300% of that emulsion (calculated on the weight of the pared leather), containing about 2% of the oil (calculated on the weight of the pared leather) with the leather to be treated in a rotating cask.

5. Improved process in the manfuacture of leather comprising the production of a watery emulsion of tea-seed oil, the dyestuff of which has been destroyed by means of bleaching, finally bringing into contact such an emulsion with tanned leather.

6. Improved process in the manufacture of leather comprising the production of a watery emulsion of tea-seed oil, the dyestuff of which has been destroyed by means of bleaching, this emulsion being prepared at a temperature of 50–70° C., finally bringing into contact 60–300% of that emulsion (calculated on the weight of the pared leather), containing about 2% of the oil (calculated on the weight of the pared leather) with the leather to be treated in a rotating cask.

7. Improved process in the manufacture of leather comprising the production of a watery emulsion of a sulfonated oil containing 85–95% of unsaturated fatty acids of the oleic acid series and being liquid down to temperatures between −6° to −25° C., finally bringing into contact such an emulsion with tanned leather.

8. Improved process in the manufacture of leather comprising the production of a watery emulsion of a sulfonated vegetable oil, containing 85–95% of esters of unsaturated fatty acids of the oleic acid series and being liquid down to temperatures between −6° to −25° C., this emulsion being prepared at a temperature of 50–70° C., finally bringing into contact 60–300% of that emulsion (calculated on the weight of the pared leather), containing about 2% of the oil (calculated on the weight of the pared leather) with the leather to be treated in a rotating cask.

9. Improved process in the manufacture of leather comprising the production of a watery emulsion of sulfonated tea-seed oil, finally bringing into contact such an emulsion with tanned leather.

10. Improved process in the manufacture of leather comprising the production of a watery emulsion of sulfonated tea-seed oil, this emulsion being prepared at a temperature of 50–70° C., finally bringing into contact 60–300% of that emulsion (calculated on the weight of the pared leather), containing about 2% of the oil (calculated on the weight of the pared leather) with the leather to be treated in a rotating cask.

11. Improved process in the manufacture of leather comprising the production of a watery emulsion of sulfonated tea-seed oil, the dyestuff of which has been destroyed by means of bleaching, finally bringing into contact such an emulsion with tanned leather.

12. Improved process in the manufacture of leather comprising the production of a watery emulsion of sulfonated tea-seed oil, the dyestuff of which has been destroyed by means of bleaching, this emulsion being prepared at a temperature of 50–70° C., finally bringing into contact 60–300% of that emulsion (calculated on the weight of the pared leather), containing about 2% of the oil (calcuated on the weight of the pared leather) with the leather to be treated in a rotating cask.

13. A method of treating leather which comprises subjecting the same to the action of a vegetable oil of the class consisting of teaseed oil, apricot oil, peach kernel oil and almond oil.

14. A method of treating leather which comprises subjecting the same to the action of sulphonated vegetable oil of the class consisting of teaseed oil, apricot oil, peach kernel oil and almond oil.

15. A method of treating leather which comprises subjecting the same to the action of a watery emulsion of a vegetable oil of the class consisting of teaseed oil, apricot oil, peach kernel oil and almond oil.

16. A method of treating leather which comprises subjecting the same to the action of a vegetable kernel oil, said oil being liquid down to a temperature of at least $-6°$ C.

17. A new and useful product, a leather fatliquored with an emulsion comprising an oil of the class consisting of sulfonated or unsulfonated teaseed oil, almond oil, and the kernel oils of peach and apricot.

18. A new and useful product, a leather stuffed with an oil of the class consisting of sulfonated or unsulfonated teaseed oil, almond oil, and the kernel oils of peach and apricot.

19. For use in the stuffing and fatliquoring of leather, a plurality of glyceride oils at least one of which is a vegetable oil of the class consisting of unsulfonated or sulfonated teaseed oil, almond oil, and the kernel oils of peach and apricot.

HEINZ KROCH.
FRANK A. ENGLISH.